US006380983B1

(12) United States Patent
Miyazaki et al.

(10) Patent No.: US 6,380,983 B1
(45) Date of Patent: Apr. 30, 2002

(54) TV RECEIVER WITH SELECTABLE SIGNAL PROCESSING SYSTEMS

(75) Inventors: Toru Miyazaki; Seijiro Yasuki, both of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/041,668

(22) Filed: Mar. 13, 1998

(30) Foreign Application Priority Data

Mar. 14, 1997 (JP) .............................................. 9-060277

(51) Int. Cl.[7] .............................. H04N 3/27; H04N 5/46
(52) U.S. Cl. ......................... 348/554; 348/555; 348/571
(58) Field of Search ................................. 348/552, 553, 348/554, 555, 556, 558, 725, 571, 575, 563, 564, 565, 576, 704, 458, 445, 569, 663, 664; H04N 3/27, 5/46

(56) References Cited

U.S. PATENT DOCUMENTS 5,459,526 A * 10/1995 Yamada ...................... 348/555

5,796,442 A * 8/1998 Gove et al. .................. 348/556
5,982,449 A * 11/1999 Nagai et al. ................. 348/553

FOREIGN PATENT DOCUMENTS

JP            8-30577         2/1996

* cited by examiner

Primary Examiner—Michael Lee
(74) Attorney, Agent, or Firm—Pillsbury Winthrop LLP

(57) ABSTRACT

A TV receiver with selectable signal processing systems in which main controller 103 selects a proper signal processing system according to signal processing unit 120 based on the results of monitoring the type and the number of the input signals by input signal monitor 102 and the monitor result for user's request by signal display monitor 123. Main controller 103 downloads the instruction program from program memory 104, and then transfers the instruction program to signal processing unit 120. Accordingly, signal processing unit 120 performs one unit of the three-dimensional Y/C separation, two units of the two-dimensional Y/C separations or three units of the one-dimensional Y/C separation on the NTSC video signal.

26 Claims, 14 Drawing Sheets

| | | |
|---|---|---|
| www | HTML VIEWER | : ○ |
| | IMAGE DECODE | : ○ |
| | VIDEO DECODE | : ○ |
| | AUDIO DECODE | : ○ |
| | HISTORIC RECORD UNITS | : 10 |

INTERNET MAIL : ○
INTERNET NEWS : ○

PICTURE SIZE CHANGE : —
COLOR : FULL COLOR
FONT : OUTLINE FONT
SIGNALLING RATE : 28.8Kbps
CAPACITY OF HIGH-SPEED MEMORY 111 : 1MB
PRIORITY OF CPU CORE UNIT 114 : 80%
FLICKER ELIMINATION : INTER-FIELD PROCESSING

*FIG. 5a*

| | | |
|---|---|---|
| www | HTML VIEWER | : ○ |
| | IMAGE DECODE | : X |
| | VIDEO DECODE | : X |
| | AUDIO DECODE | : X |
| | HISTORIC RECORD UNITS | : 5 |

INTERNET MAIL : ○
INTERNET NEWS : ○

PICTURE SIZE CHANGE : ○
COLOR : 64K COLORS
FONT : OUTLINE FONT
SIGNALLING RATE : 14.4Kbps
CAPACITY OF HIGH-SPEED MEMORY 111 : 512KB
PRIORITY OF CPU CORE UNIT 114 : 40%
FLICKER ELIMINATION : INTRA-FIELD PROCESSING

*FIG. 5b*

| www | HTML VIEWER | : ○ |
| | IMAGE DECODE | : X |
| | VIDEO DECODE | : X |
| | AUDIO DECODE | : X |
| | HISTORIC RECORD UNITS | : 1 |

INTERNET MAIL : ○
INTERNET NEWS : ○

PICTURE SIZE CHANGE : △
COLOR : 256 COLORS
FONT : BITMAP FONT
SIGNALLING RATE : 14.4Kbps
CAPACITY OF HIGH-SPEED MEMORY 111 : 256KB
PRIORITY OF CPU CORE UNIT 114 : 20%
FLICKER ELIMINATION : X

| | |
|---|---|
| A MODE | ○ |
| B MODE | ○ |
| IT SUPPORT | ○ |
| IMAGE DISPLAY | ○ |
| PICTURE SIZE CHANGE | — |
| | |
| CAPACITY OF HIGH-SPEED MEMORY 111 | 128K |
| PRIORITY OF CPU CORE UNIT 114 | 80% |
| FONT | OUTLINE FONT |
| FLICKER ELIMINATION | INTER-FIELD PROCESSING |

FIG. 6b

| | |
|---|---|
| A MODE | ○ |
| B MODE | × |
| IT SUPPORT | ○ |
| IMAGE DISPLAY | × |
| PICTURE SIZE CHANGE | △ |
| | |
| CAPACITY OF HIGH-SPEED MEMORY 111 | 32KB |
| PRIORITY OF CPU CORE UNIT 114 | 20% |
| FONT | BITMAP FONT |
| FLICKER ELIMINATION | × |

FIG. 6c

| | |
|---|---|
| A MODE | ○ |
| B MODE | × |
| IT SUPPORT | ○ |
| IMAGE DISPLAY | ○ |
| PICTURE SIZE CHANGE | ○ |
| | |
| CAPACITY OF HIGH-SPEED MEMORY 111 | 64KB |
| PRIORITY OF CPU CORE UNIT 114 | 40% |
| FONT | OUTLINE FONT |
| FLICKER ELIMINATION | INTRA-FIELD PROCESSING |

FORWARD PREDICTIVE COMPENSATION: ○
REARWARD PREDICTIVE COMPENSATION: ○
FORWARD/REARWARD
PREDICTIVE COMPENSATION: ○

DCT: 8 × 8

FIG. 9a

FORWARD PREDICTIVE COMPENSATION: X
REARWARD PREDICTIVE COMPENSATION: X
FORWARD/REARWARD
PREDICTIVE COMPENSATION: X

DCT: 8 × 8

FIG. 9b

FORWARD PREDICTIVE COMPENSATION: X
REARWARD PREDICTIVE COMPENSATION: X
FORWARD/REARWARD
PREDICTIVE COMPENSATION: X

DCT: 4 × 4

FIG. 9c

TV RECEIVER WITH SELECTABLE SIGNAL PROCESSING SYSTEMS

FIELD OF THE INVENTION

The present invention generally relates to a TV receiver with selectable signal processing systems.

BACKGROUND OF THE INVENTION

In recent years, as the progress of the digital technique, digital technique application products have been widely spread in consumer goods. The TV receiver is not exception to such consumer goods. That is, the digital techniques are used in various picture processing systems dedicated to the TV receiver beginning with a teletext decoder and a high picture quality three-dimensional Y/C separator.

Further, multimedia technique application products based on an MPEG or an Internet architecture are on their way of developing.

FIG. 10 shows a block diagram of a conventional TV receiver having such various functions as described above. While FIG. 11 shows a display example obtained by such a TV receiver. The configuration of the conventional TV receiver will be described hereinafter in reference to FIGS. 10 and 11.

A video signal is input to an input terminal 1001. The input video signal is decoded in an NTSC video decoder 1002, so that three of Y, I and Q signals are supplied to a picture size compressor 1011.

In the NTSC video decoder 1002, first, a signal is divided into the luminance signal and the chrominance signal in a three-dimensional Y/C separator 1004. A RAM 1003 is used for causing a three-dimensional frame delay.

A color signal is decoded by a color decoder 1005, then two chrominance signals I and Q are obtained from the color decoder 1005.

Further, a separation of horizontal and vertical synchronizing signals are implemented by a synchronous separation circuit (not shown).

And, not shown in FIG. 10, the conventional TV receiver further includes fine adjustment control arrangements comprising an ACC, a hue control and a picture quality control etc, which are commonly comprised in ordinary TV receivers.

The decoded NTSC signal is compressed or expanded to a proper picture size in the picture size compressor 1011. For a full screen picture display the picture size may be compressed or expanded in a nonlinear manner to change compression rates at the center or the sides of the screen.

A RAM 1012 is used for aligning time of signals before and after the compression. For compressing to, e.g., one half, the number of pixels during one horizontal scanning period are reduced to one half, so that the RAM 1012 operates to output two same pixels.

To an input terminal 1006, a video signal for a second channel is input. The second input video signal is decoded to three of Y, I, Q signals as described above in an NTSC video decoder 1007.

The decoded signal is then compressed to a proper picture size in a picture size compressor/frame synchronizer 1010 wherein the decoded signal is further phase-synchronized with the video signal on the first channel supplied through the input terminal 1001.

In more detail, the decoded signal may be written into a RAM 1009 by being synchronized with the second video signal from the input terminal 1006 for a write-in in time. The decoded signal may also be read out from the RAM 1009 by the clock which is phase-synchronized with the video signal on the first channel input through the input terminal 1001 for a read out time.

To an input terminal 1013, still another video signal is input. The third input video signal is decoded in a teletext decoder 1014 to extracts a teletext data therefrom. An input processor 1015 extracts the teletext data multiplexed on the 10th horizontal scanning line of the input video signal, and then stores the extracted data in a RAM 1017. The input processor 1015 often includes an error corrector or a waveform equalizer to improve an anti-ghost performance or an anti-noise performance.

The stored data are decoded using a CPU 1016, the RAM 1017 and a ROM 1018, and thus then picture data are formed and stored in the RAM 1017.

A memory controller 1036 reads out the picture data properly. Accordingly, the RAM 1017 is used not only for temporary data storage but for graphic memory.

The ROM 1018 stores the programs for processing and the data for character display, so-called a character font.

For the teletext receiver, the display data has a non-real time property. Thus the picture size compressor/frame synchronizer 1010 used for NTSC signal processing as described above is not necessary. Signals are usually processed by a software because of its non-real time property.

It is possible to synchronize the display data with the data on the first channel by synchronizing the read out operation of the memory controller 1036 with the synchronizing signal of the data on the first channel.

Here, the input terminal 1013 is described to be independent of the input terminals 1001 and 1006. However, this video signal is not necessary to be independent of the signals input to the input terminals 1001 and 1006.

On the other hand, to an input terminal 1019 an MPEG bit stream is input. The digital broadcast has started since 1996 in this country, so that the digital video stream has begun to take the place of the analog signal.

The MPEG can be classified into a MPEG-1 represented as a video DC and a MPEG-2 represented by the digital broadcast as described above. Further, the MPEG-2 bit stream is classified into a TS (transport stream) and a PS (program stream).

Generally, devices capable of decoding the MPEG-2 pictures are capable of decoding the MPEG-1 pictures too.

The TS is basically applied for broadcast uses, while the PS is applied for package media such as a DVD.

Here, it is assumed that the PS is input to the input terminal 1019. An MPEG decoder 1020, as same as the teletext receiver, generally tends to process the high-speed processing part such as a CDT (discrete cosine transform) in its dedicated circuit, and to process others in the software such as a CPU.

Accordingly, not shown in the drawings, the MPEG decoder 1020 often includes a CPU. The decoded MPEG signal is implemented the synchronizer or the picture size compression processing in a picture size compressor/frame synchronizer 1038 and a RAM 1039 to establish the synchronization with the first channel as same as the NTSC picture decoder.

An input terminal 1022 is coupled to a telephone line, and thus an Internet terminal unit/graphic engine designated by 1023 is able to access Internets. The signal from the telephone line is converted into the digital signal in a modem 1024. In the modem 1024 the processing related to the modulation such as a flow control and error correction not only the signal conversion.

The processing after this process is similar to the operation of the teletext decoder 1014.

The digital signal from the modem 1024 is stored in a RAM 1027 via a CPU 1025 and a memory controller 1026. Then, according to the processing program stored in an ROM 1028 the digital signal is decoded by the RAM 1027 and the CPU 1025, so that the picture display data is formed and then stored in the RAM 1027.

The memory controller 1026 reads out the picture display data property from the RAM 1027 to output the picture. Accordingly, the RAM 1027 is used not only for the temporary data storage for processing but for the graphic memory.

The ROM 1028 stores the program for processing and the character display data, so-called the character font.

The display data has a non-real time property in similar to the teletext data. Thus it is possible to process the most of the display data based on software, and also possible to synchronize with the first channel by aligning the read-out operation of the memory controller 1026 with the synchronizing signal of the data on the first channel.

A timing controller 1033 controls the read out timings of each picture in the picture size compressor 1011, the picture size compressor/frame synchronizer 1010, the teletext decoder 1014, the MPEG decoder 1020 and the Internet terminal apparatus unit/graphic engine 1023.

A main controller 1029 provides processing instructions to the timing controller 1033 and each decoder according to the control signal input through a control input terminal 1037. The control signal input through the control input terminal 1037 includes instructions from users as well as the system of the present TV receiver.

As shown in FIG. 10, the conventional TV receiver needs the dedicated units for each input to receive and reproduce various signals. This results to increase the circuit scale, so as to hike the cost of the product.

For developing LSIs, such a dedicated unit has a problem of increasing the chip size and also dissipates excessive powers, so as to be a serious impediment to a commercialization of such TV receivers. Further, if each circuit of the TV receivers is constructed with a full hardware configuration, it will lose a future extensibility and also becomes an impediment to the flexible product development.

When each unit as shown in FIG. 10 are operated at the same time, all receivable signals are displayed. Such kind of usage is limited in very few cases.

Further, when two or more channel signals are displayed simultaneously, the picture size of each channel signal will become smaller, as shown in FIG. 11. When the picture size decreases, the picture quality degradation such as some degree of the resolution will not be noticed.

However, if many pictures were simultaneously displayed, it is practically seldom that a viewer concentrates on those pictures at once. Thus if there were any degradation in the signal processing rate or various functions, the simultaneous display of many pictures will not cause a big problem.

SUMMARY OF THE INVENTION

It is, therefore, an object of the present invention is to provide a TV receiver with selectable signal processing systems which monitors the number, the type or the state of displayed pictures in reference to a situations of a multi-picture display, and deteriorates the signal processing efficiencies and functions in order of signals having lower priority according to the monitored result, and thus lowers its signal processing ability for each channel for serving the surplus of the signal processing resources to other signal processing.

In order to achieve the above object, a TV receiver with selectable signal processing systems according to first aspect of the present invention includes a programmable digital signal processor capable of changing the internal signal processing systems according to a signal processing control signal, an input signal monitor for monitoring at least any one of the number and the type of the input TV signals, and a signal processing controller for indicating the signal processing control signal to the signal processor according to the monitored result.

A TV receiver with selectable signal processing systems according to second aspect of the present invention includes a programmable digital signal processor capable of changing the internal signal processing systems according to a signal processing control signal, an input signal monitor for monitoring at least any one of the number, the type and the state of the displayed video signal, and a signal processing controller for indicating the signal processing control signal to the signal processor according to the monitored result.

A TV receiver with selectable signal processing systems according to third aspect of the present invention includes a programmable digital signal processor capable of changing the internal signal processing systems according to a signal processing control signal, an input signal monitor and a signal display monitor for monitoring at least any one of the number, the type and the state of the displayed video signal, and a signal processing controller for indicating the signal processing control signal to the signal processor according to both the monitor results.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 5a to 5c are control specification examples of the Internet terminal apparatus in FIG. 1;

FIGS. 6a to 6c are functional list diagrams relating to the teletext receiver features of the TV receiver of FIG. 1;

FIGS. 9a to 9c are specification examples relating to the adaptive controls of the MPEG decoder in FIG. 7;

DESCRIPTION OF THE PREFERRED EMBODIMENTS

The present invention will be described in detail with reference to FIGS. 1 through 9, as well as FIG. 12.

Figure 1:
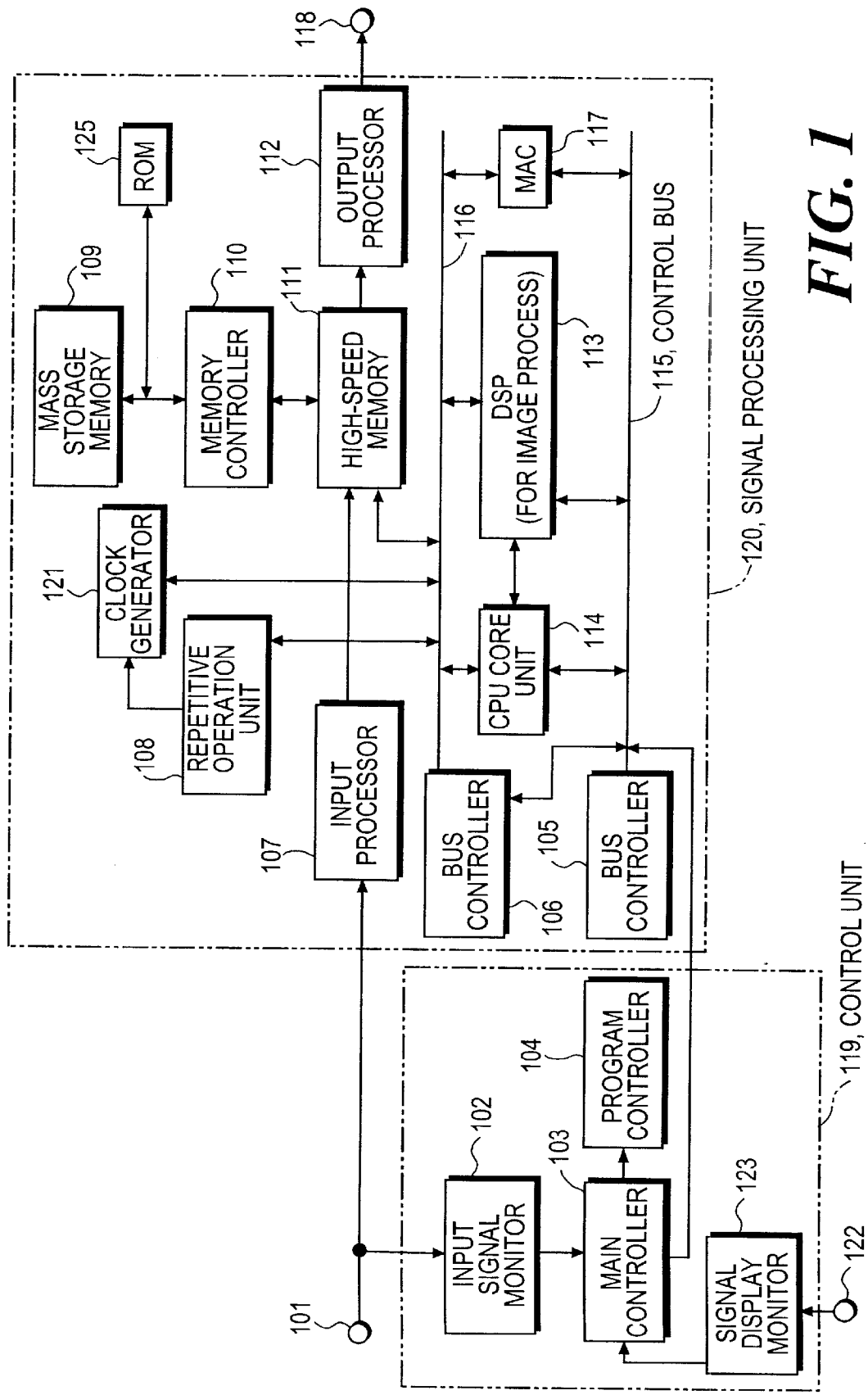
FIG. 1 is a block diagram showing an embodiment of the TV receiver according to the present invention.

The embodiment of the TV receiver according to the present invention will be shown in FIG. 1. Hereinafter this embodiment will be described.

An input terminal 101 is provided for receiving a signal source to be displayed. In FIG. 1 the signal source is represented with a single line. However, the number of signal line does not correspond to the number of signals. For instance, when two NTSC pictures are displayed, the signal line actually carries two input signals.

An input signal is converted to a signal format suitable to be processed by a signal processing unit designated by 120 in an input processor 107.

For instance, when an analog video signal is applied, an A/D converter or a clamper represents the signal processing unit 120.

Further, the signal processing unit 120 includes an interface controller to a high-speed memory 111, so that input data are temporarily stored in the high-speed memory 111.

Here the input processor 107 basically operates on a clock depending to the input signal. However, various kinds of signal processing to be carried out after the input processor 107 are not necessary to operate on the input signal-based clock. Therefor, the input data are temporarily stored to change the clock rate of the input data. Further, the input data or a part of the input data can be temporarily stored in an external mass storage memory 109.

The signal processing to be carried out after the input processor 107 is divided into three phases depending on a required signal processing ability.

Operation clocks far faster than the clock for the input processor 107 are used in the three phases. While the operations clocks are generated by a clock (CK) generator 121.

In the first phase, when simple but enormous amounts of signal processings are needed in a short time to harmonize with two-dimensional or three-dimensional accelerator in the NTSC picture decoder or a computer graphics unit, the input data are processed by a DSP (Digital Signal Processor) unit 113.

Further, a product sum operation typically required in a digital linear filtering or a DCT (discrete cosine transform) etc. is processed by a product sum operation (Mac) unit 117, and then used for a picture size compression/expansion or an MPEG decoding.

The processing of the Internet terminal apparatus which does not have a specific limit for the processing time but needs the complex processing for manifold processing contents, the teletext decoding or the simple computer graphics are processed by a CPU core (core) unit 114.

Further, processing of repetitively carrying out similar operations which is typically implemented in oscillators for generating such as clock signals (CK) or various synch signals (e.g., for a QAM (quadrature amplitude modulation) carrier, a color subcarrier or horizontal/vertical synchs) and a memory control counter is implemented by a repetitive operation unit 108.

These each signal processing operation unit is not necessary operated independently. For instance, in the NTSC color subcarrier reproducing PLL, operations for directly processing the video signal such as a detection and a harmonics suppression LPF operation etc. are implemented by the DSP unit 113. While operations which can be over by just single implementation per each horizontal scanning period (1/H) such as a loop filter operation for controlling a PLL etc. are implemented by the CPU core unit 114.

Further, various protocol controls are implemented by the CPU core unit 114 for the Internet terminal apparatus. When needed a picture or an audio decoding in the WWW (World Wide Web), the DSP unit 113 or the product sum operation (Mac) unit 117 can be used. Further, for the picture size detection installed in recent TV receivers processing for every scanning line can be implemented by the DSP unit 113, while processing for every field can be implemented by the CPU core unit 114.

The high-speed memory 111 and the mass storage memory 109 are used as a temporary storage for various operations or a device for transferring data between different operation processing units.

As the temporary storage, these two memories are changed each other according to the access frequency of the data.

For instance, the data to be accessed frequently in a short time such as the DCT or digital linear filter/image signal processing are stored in the first memory 111. Data processed at a non-real time on occasions such as a teletext receiving or data infrequently accessed on occasions such as a frame delay operation in a three-dimensional Y/C separation are stored in the mass storage memory 109.

Accordingly, the high-speed memory 111 is required to have a rapid access characteristic such as the one represented in SRAMs. While since the mass storage memory 109 is required to have a mass storage performance rather than the rapid access characteristic, DRAMs suit for the mass storage memory 109.

A high-speed bus 116 provides a data transfer line between the operation unit and the memory circuit, while its bus-arbitration control is implemented by a bus controller 106.

The processing contents of the CPU core unit 114, the product sum operation (Mac) unit 117 and the DSP unit 113 are applied from a control unit 119 via a control bus 115. The information processing contents are freely changeable by the instruction contents.

The control bus 115 is also used for transferring the comparative late judging result (determined by the CUP core unit 114) such as the picture size detection as described above, which transferring rate is far later than the high-speed bus 116. The control bus 115 is controlled its bus-arbitration by a bus controller 105.

To the control unit 119, the input signal from the input terminal 101 and a system control signal from a control input terminal 122 are applied. The system control signal includes the various demand instructions from the user such as the picture size or display location.

An input signal monitor 102 monitors the kinds of input signal. For instance, the input signal monitor 102 monitors what type of input signal is input (NTSC video signal or MPEG data), or how many signals are input.

Although there is an approach of directly monitoring the input signal, it is also possible to determine the properties of the input signal indirectly from system control signals entered by users.

For instance, in this country, the NTSC broadcast has been implemented using a ground wave, BS and CS so far. However, the digital broadcast has been carried out with only the CS wave at present, and its channels are limited beforehand. Accordingly, the digital broadcast may be determined by which channel has been selected by users.

A signal display monitor 123 monitors a currently displayed signal out of all input signals. The currently displayed signal is basically determined in responding to the user's request, and thus it is determined in accordance with the system control signal provided through the control input terminal 122. A main controller 103 selects a proper signal processing system according to the signal processing unit 120 based on the monitor results of the input signal monitor 102 and the signal display monitor 123. The main controller 103 downloads the instruction program from a program memory 104 and then transfers the instruction program to the signal processing unit 120.

Hereinafter, the controlling method will be described.

Figure 2:
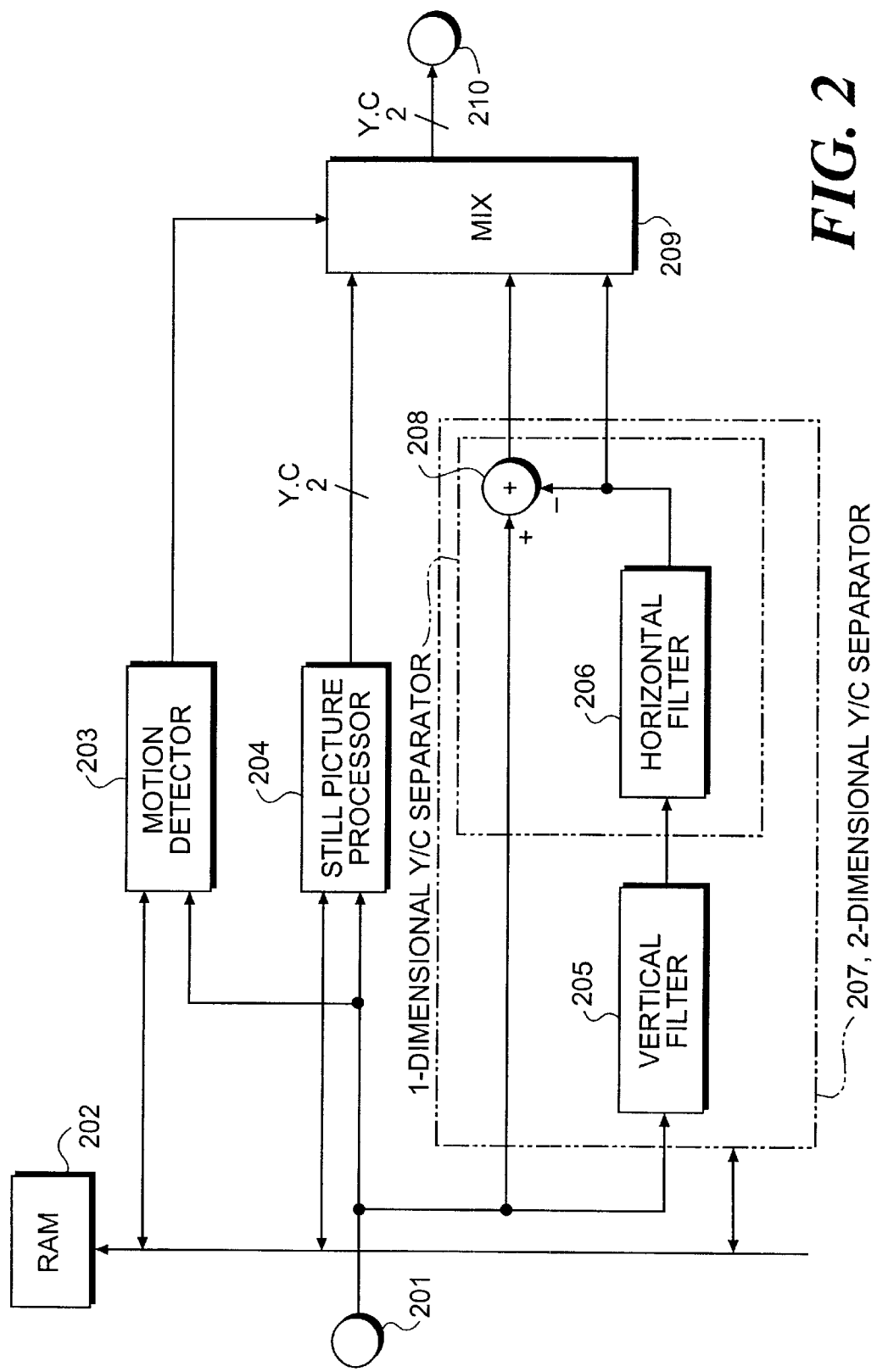
FIG. 2 is a block diagram showing a three-dimensional Y/C separator for the NTSC video decoder of the FIG. 1.

FIG. 2 shows a block diagram of a three-dimensional Y/C separator of the NTSC video decoder. Hereinafter this FIGURE will be described briefly. An input terminal 201 is provided for receiving the video signal processed by the input processor 107. Then the horizontal/vertical high frequency band of the signal are extracted by a vertical filter 205 and a horizontal filter 206. The extracted high frequency band corresponds to the chrominance signal component. The chrominance signal component is subtracted from the video signal in an adder 208 so as to be the luminance signal component.

Such an intra-field processing causes an incomplete separation at the changing part of the picture so as to cause the picture quality degradation. So, in the three-dimensional separation the complete separation is implemented in the still picture by using an inter-frame processing in a still picture processor 204.

However, a side effect such as an afterimage occurs in a moving picture. Then a motion detector 203 detects a still picture component in the moving picture. So that, these pictures are carried out an adaptive processing by a mixer (MIX) 209, wherein only the still picture is adapted with the inter-frame processing in the still picture processor 204 and the moving picture is adapted with the intra-frame processing in a two-dimensional Y/C separator 207.

Here, a RAM 202 corresponds to the high-speed memory 111 or the mass storage memory 109, and elements other than the RAM 202 correspond to the DSP unit 113 and the product sum operation (Mac) unit 117.

The NTSC picture decoder Y/C separation is not limited to the embodiment as described above. For instance, the chrominance signal and the luminance signal are extracted from the outputs of the horizontal filter 206 and the adder 208 as described above. Accordingly, a Y/C separation unit is included in each of the vertical filter 205, the horizontal filter 206 and the adder 208. The method for processing within the field not using the motion detector 203, the still picture processor 204 or the mixer 209 is referred to the two-dimensional Y/C separator 207.

In this system as seen in FIG. 2, it is possible to simplify the processing by the surplus in line with the capacities for the still picture processor 204 and the motion detector 203.

Further, the vertical filter 205 is eliminated, the video signal input to the input terminal 201 is connected to the horizontal filter 206 directly, and the output is subtracted from the video signal, so as to realize the Y/C separation.

Such a separation system referred to a one-dimensional Y/C separation is implemented by far simpler signal processing unit than that for the two-dimensional Y/C separation. On the other hand, compared with the three-dimensional Y/c separation the two-dimensional Y/C separation has the deterioration in the performance apparently, and the one-dimensionalY/C separation has far severe deterioration about the performance.

In common, the large screen TV receiver uses the three-dimensional Y/C separation since such deterioration is easy to be noticed by viewers. The more the screen size of the TV receivers is reduced so as that the deterioration becomes hard to be noticed by viewers, the more they become capable of utilizing the two-dimensional or one-dimensional Y/C separation.

In the present invention, the system configuration is controlled by the instruction from the control unit 119 with the aid of the relationship between the picture size and the required quality.

Figure 3A:
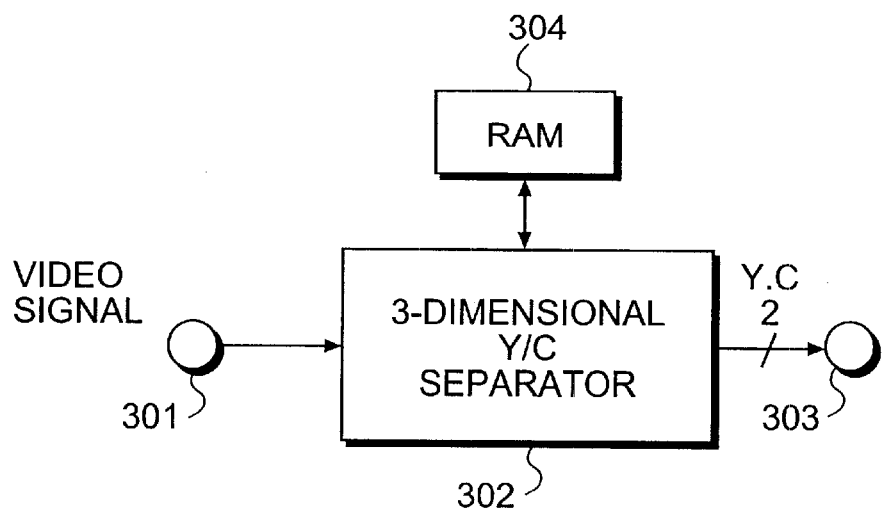
FIGS. 3a to 3c are block diagrams showing a variety of Y/C separators for the NTSC video decoder in the FIG. 1.
Figure 3B:
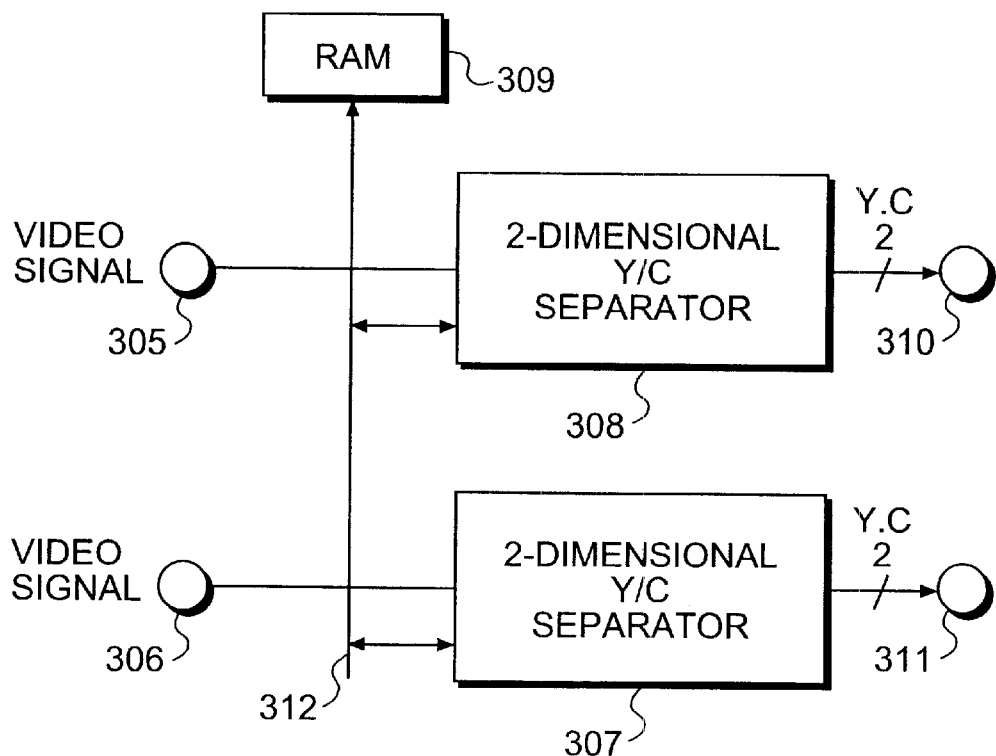
Figure 3C:
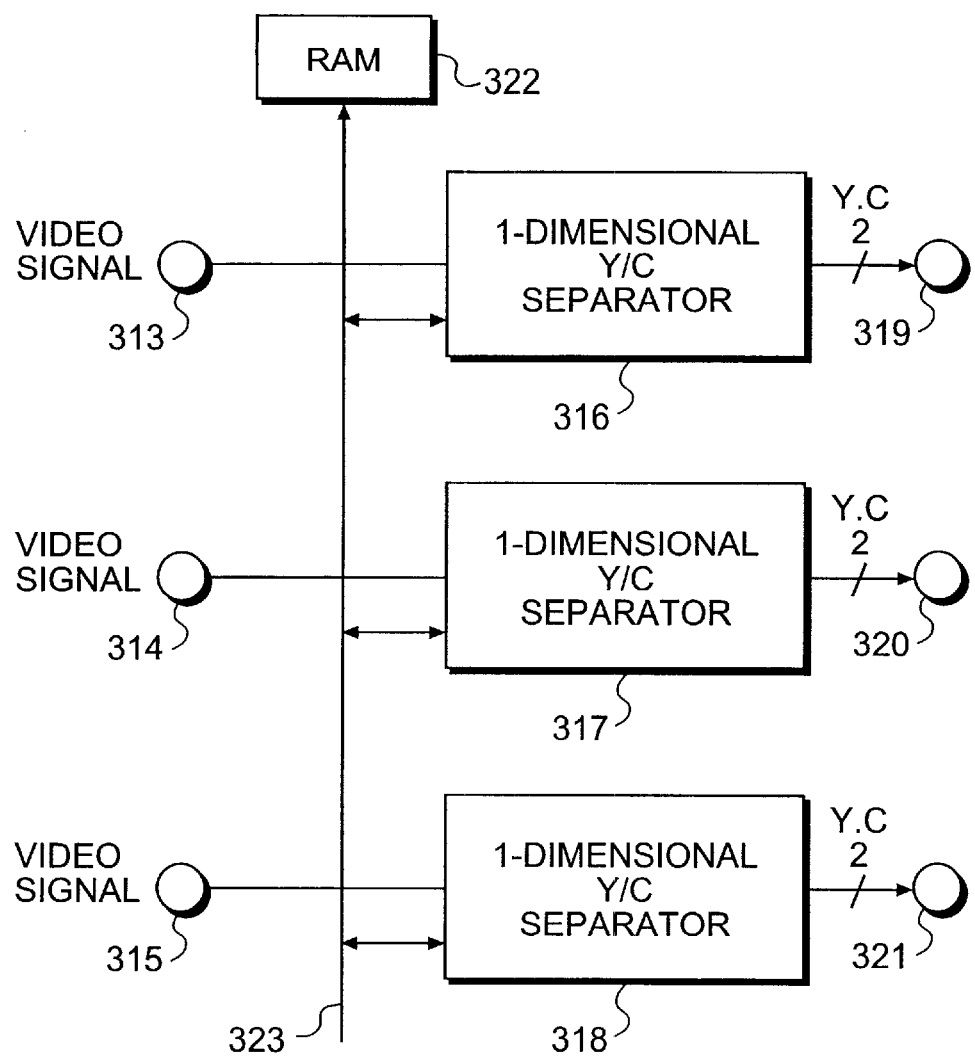
Figure 3D:
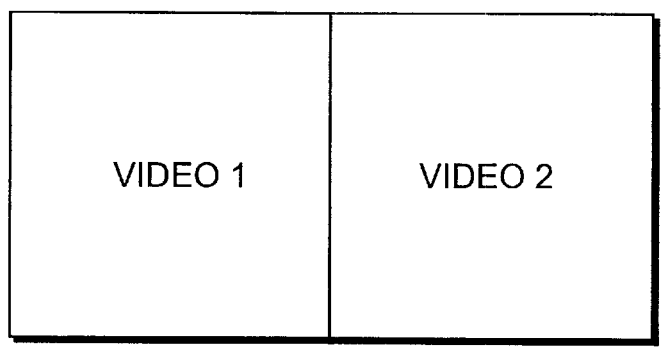
FIG. 3d is a diagram showing a multi-picture display pattern with two similar size picture displays.

FIGS. 3a to 3e show examples of the system configurations, and FIG. 3d shows a multi-picture display pattern related to these system configurations. FIG. 3a shows the construction for displaying the picture on a full screen picture display. FIG. 3b shows on two screens, FIG. 3c shows the case that the screen to be displayed on are more than two.

Here, an input terminal 301 in FIG. 3a receives the video signal which has been processed by the input processor 107. Input terminals 305 and 306 in FIG. 3b receive video signals which have been processed by the input processor 107. And, input terminals 313, 314 and 315 in FIG. 3c receive video signals which have been processed by the input processor 107.

For the full screen picture display, since the picture display has the maximum size and it is easy to notice for viewers noises caused by an incomplete Y/C separation the three-dimensional Y/C separation providing the best picture quality is used.

A RAM 304 corresponding to the RAM 202, which is used mainly for the line delay and the frame delay generation, is required the capacity for generating at least one frame delay.

For displaying two or more pictures, for instance, as shown in FIG. 3d showing a multi-picture display pattern simultaneously displaying a right-half picture and a left-half picture, the display size for each picture will become smaller than that of the full screen display.

Since the screen becomes smaller and the quality improvement effect by the three-dimensional Y/C separation becomes fainter, it will be hard to notice for viewers some picture quality degradations.

So, for displaying on the two screens the two-dimensional Y/C separation as shown in FIG. 3b is adapted.

For a two-dimensional Y/C separator 308, the two-dimensional Y/C separator 207 in the three-dimensional Y/C separator shown in FIG. 2 can be used as it is. The signal processing resources of the motion detector 203, the still picture processor and the mixer circuit (MIX) which became unnecessary may be assigned to a two-dimensional Y/C separator 307. Such kind of assignment is implemented by the instruction from the control unit 119.

As a line memory is enough to have a capacity for storing two lines data per one picture for the two-dimensional Y/C separation, a RAM 309 is enough to have a capacity the same as that of the RAM 304 which is used for the three-dimensional Y/C separation.

Further, as an operation clock for the Y/C separation there is generally used a color burst in the input video signal or a clock which is phase-synchronized with the horizontal synchronizing signal. Therefore, two clocks are required to process two independent signals as shown in FIG. 3b.

However, it is desirable to operate the DSP unit 113 for processing the video signal or the product sum operation (Mac) unit 117 with single clock signal.

Figure 10:
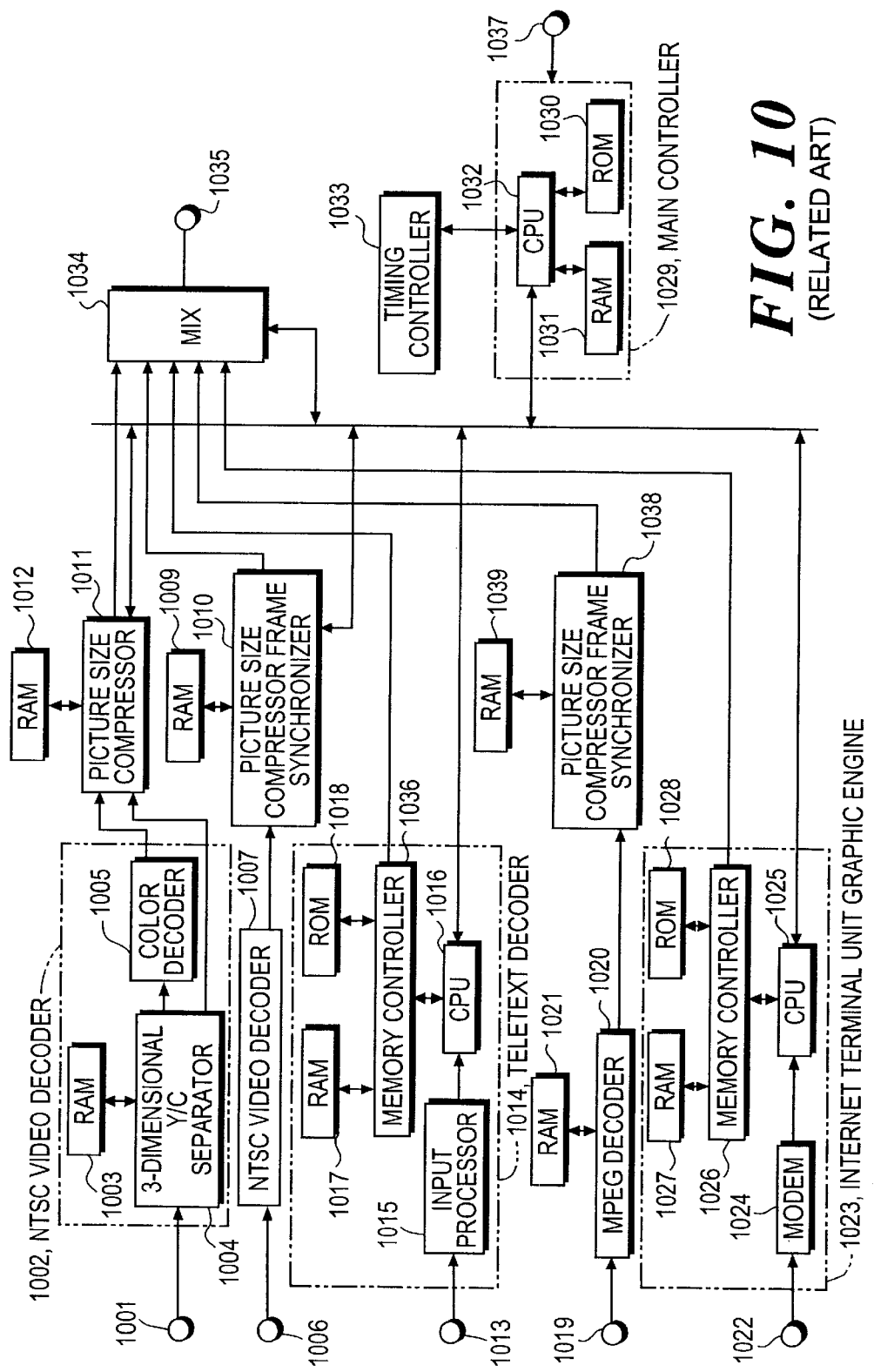
FIG. 10 is a block diagram showing a conventional TV receiver.
Figure 11:
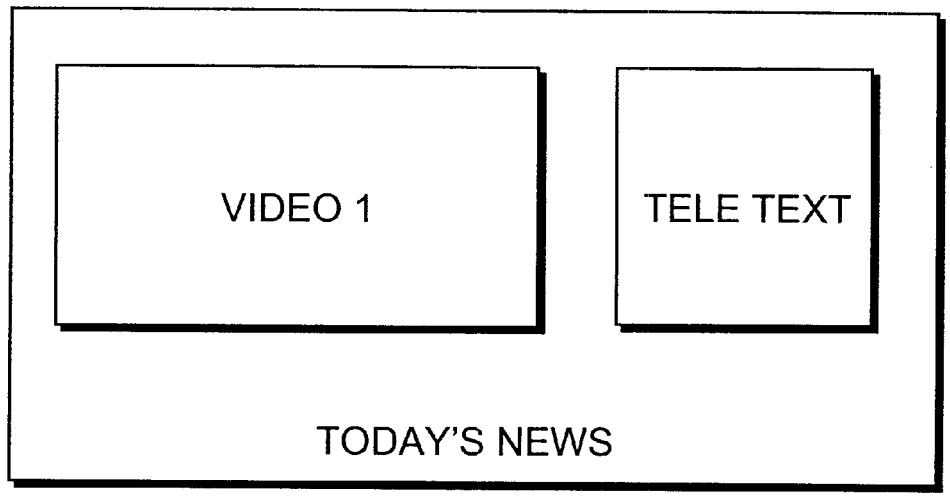
FIG. 11 is a diagram showing an example of a picture display on the conventional TV receiver of FIG. 10.

In this case, to agree the clock rates of the two signals with each other, as described in reference to the picture size compressor/frame synchronizer 1010 in FIG. 10 it is needed to align their timings with each other by controlling the writing-in and reading-out operations of the memory. The RAM 309 can be also used for such a timing alignment.

Further, when the picture displays have increased to three or come, the size of each picture display becomes much smaller, and thus it becomes far harder to notice for viewers the picture quality degradation. In this case, one-dimensional Y/C separation as shown in FIG. 4c is used.

In this case, the signal processing resources of the unneeded motion detector 203, the still picture processor 204, the mixer (MIX) 209 and the vertical filter 205 may be assigned to one-dimensional Y/C separators 317 and 318 for video signals newly input to input terminals 314 and 315. Such kind of assignment is implemented by the instruction from the control unit 119.

An RAM 322 is used not only for the temporary storage in the one-dimensional Y/C separation processing but for clock rate matching between different signals as described above.

Here, each of the RAMs 304, 309 and 322 in FIGS. 3a, 3b and 3c correspond to the high-speed memory 111 or the mass storage memory 109. A three-dimensional Y/C separating circuit 302, the two-dimensional Y/C separators 307 and 308, one-dimensional Y/C separators 316, 317 and 318 except the RAMs 304, 309 and 322 in FIGS. 3a, 3b and 3c correspond to the DSP unit 113 and the product sum operation (Mac) unit 117.

Now some examples of controls in the picture size compression/expansion will be described in reference to FIGS. 4a, 4b and 4c. Here, each of input terminals 401, 405, 406, 409, 410 and 411 in FIGS. 4a, 4b and 4c receives the color signal C which has been processed by the input processor 107. Then the color signal C is decoded to the I and Q signals by the CPU core unit 114, the DSP unit 113, the product sum operation (Mac) unit 117, the DSP unit 113 and the repetitive operation unit and the luminance signal Y. In other words, the color signal C output from the circuits as shown in FIGS. 2 and 3a to 3c are decoded to the I signal and the Q signal by the CPU core unit 114, the product sum operation Mac) unit 117 and the repetitive operation unit 108. The I and Q signals then supplied to the picture size compressor/expanders as shown in FIGS. 4a, 4b and 4c together with the Y signal.

Figure 4A:
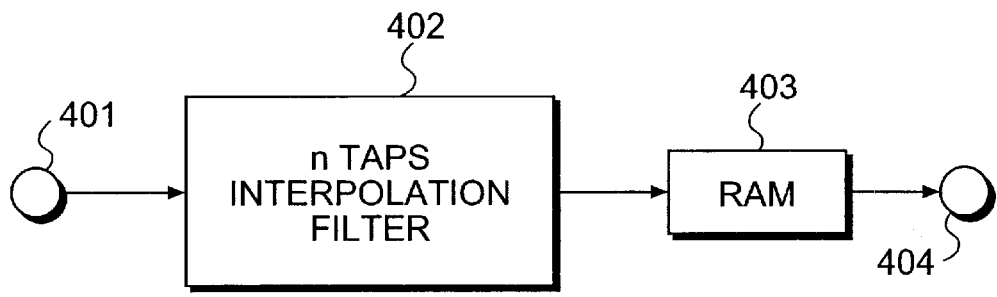
FIGS. 4a to 4c are block diagrams showing a variety of the picture size compression/expansion arrangements of FIG. 1.
Figure 4B:
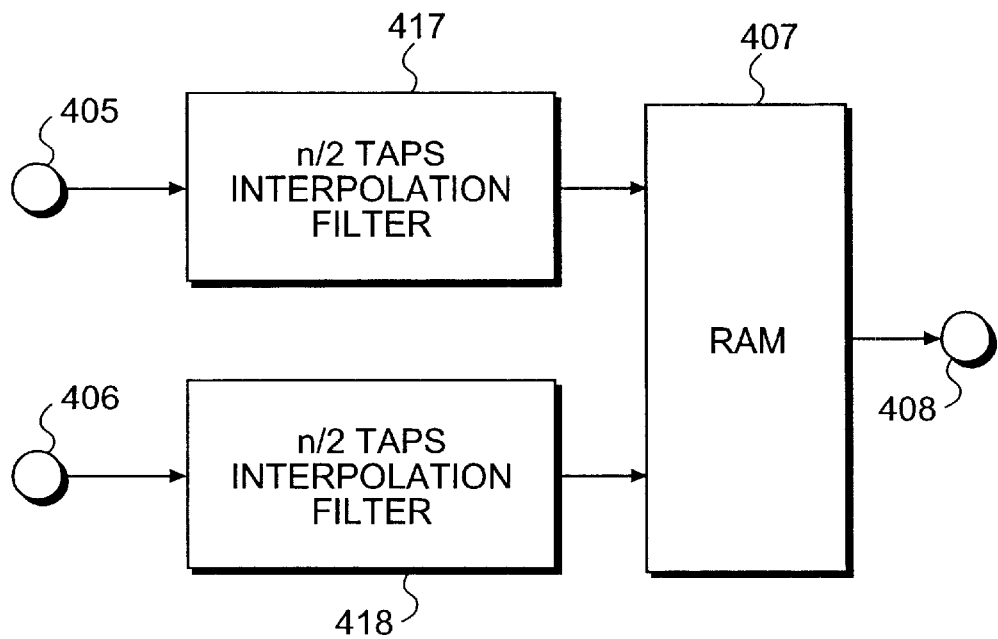
Figure 4C:
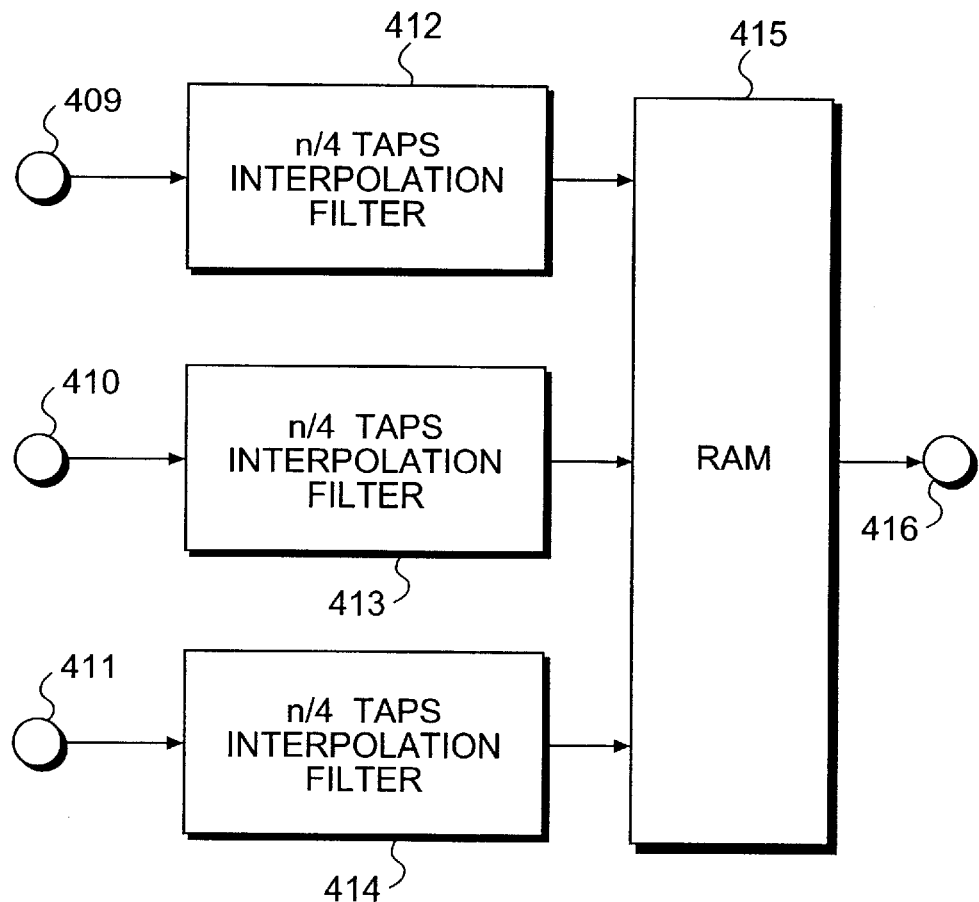

For compressing/expanding the picture size, as shown in FIG. 4a, the number of the data samples have to be changed according to its compression ratio. An n taps interpolation filter 402 and a RAM 403 operate as the data sampler.

For instance, for compressing the picture size to one half, every three data have to be extracted to make the original data samples to one half. At this time, it is possible to realize the picture size compression by one half sub-sampling simply.

However, when the picture data were sub-sampled by one half the clock rate of the virtually compressed picture is also reduced to one half. Thus the high frequency band will result to an aliasing noise for causing the picture deterioration.

Also, for expanding the picture for example, it is assumed to increase the sample to twice to expand the picture to twice. At this time, if the same sample as one just before is inserted since the aliasing frequency is twice the original high aliasing high frequency components will be appeared and results to a noise.

Figure 4D:
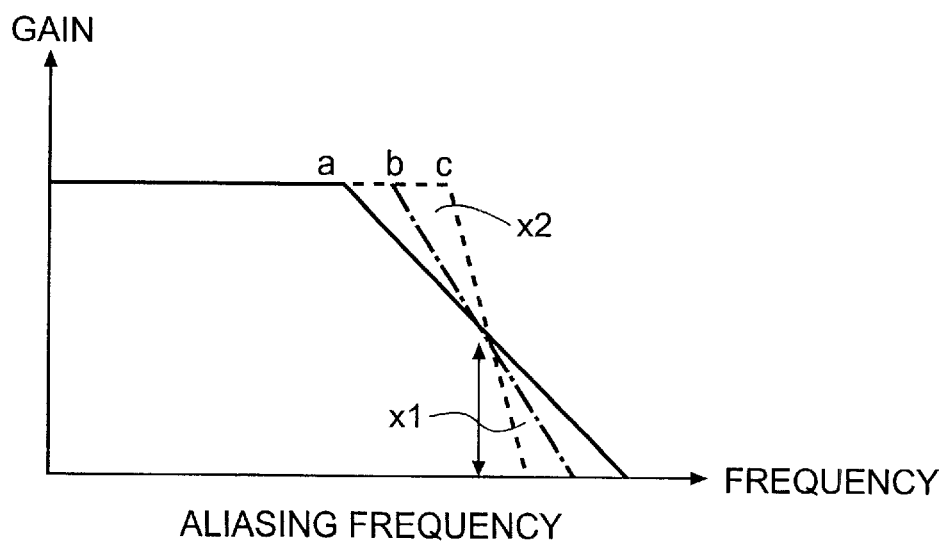
FIG. 4d is a graph showing a frequency characteristics of the interpolation filters.

The n taps interpolation filter 402 has a characteristic to eliminate the high frequency components as shown in FIG. 4d to reduce the aliasing noise. This characteristic does not have an absolute rule. However, in a broad characteristic as shown by the graph a in FIG. 4d, a large amount of the residual high frequency components are present. Thus it is easy to notice for viewers the aliasing noise denoted by x1 and the original high frequency components denoted by x2 is greatly attenuated, so as to be the picture without the modulation.

On the other hand, in a steep slant characteristic as shown by the graph c in FIG. 4d a small amounts of the residual aliasing components are present in compared with the graph a in FIG. 4d. Further for the graph c the reduction of the presentable high frequency components is little. Thus it is possible to obtain the high quality picture with lesser noise.

Here, if the upper triangle region designated by x2 in FIG. 4d is bandlimited, a picture resolution is degraded so as to cause pictures with less sharpness. While if the lower triangle region designated by x2 in FIG. 4d is kept as it is, an aliasing noise will occur.

In this embodiment, the relationship between the filter characteristics in the compression/expansion and the picture quality is utilized. That is, as same as the Y/C separation as described above, the sharp filter characteristics as shown by the graph c in FIG. 4d is used when the picture is displayed on a large screen. On the other hand, when a small size picture is displayed the broad characteristic filter as shown by the graph a is used since some degree of picture quality degradation are allowed.

In the digital linear filter generally, since this Q characteristics of the filter is controlled by the number of taps used for the filter the changing control as shown in FIGS. 4a to 4c is implemented according to the number of picture display.

This kind of changing control is controlled by the instruction from the control unit 119.

FIG. 4a shows the case that the characteristics as shown by the graph c in

FIG. 4d is obtained by the n taps interpolation filter 402,and displays a high quality pictures for a relatively large size pictures such as a full screen display picture.

FIG. 4b shows a case in that interpolation filters have taps one half of the taps of that for FIG. 4a and a little broader characteristics as shown by the graph b in FIG. 4d. The configuration of FIG. 4b is used for displaying about two pictures.

Further, for displaying three or more pictures it might better to reduce the number of taps to a quarter the taps of the case of the FIG. 4a, as shown in FIG. 4cssd, to realize the characteristics as shown by the graph a in FIG. 4d.

Here, RAMs 403, 407 and 415 coupled to the interpolation filters 402, 417, 418, 412, 413 and 414 are all provided for adjusting the data timings, as also referred in the conventional example. Since the smaller the picture will be, the smaller the data capacity after interpolation will be, an New video signal can be written in the surplus capacity so as not to define the RAM for every video signal.

In this embodiment the RAM is located next to the interpolation filter. However, it is needless to say that the RAM can be defined before the interpolation filter.

Here, the n taps interpolation filter 402, n/2 taps interpolation filter, n/4 taps interpolation filters 412, 413 and 414 correspond to the DSP unit 113 and the product sum operation (Mac) unit 117. The RAM 403, 407 and 415 correspond to the high-speed memory 111.

Now some examples for controlling the teletext receiver will be described. FIGS. 6a to 6c show examples of functional list diagrams relating to the controls.

Referring now to FIGS. 6a to 6c, there will be described about an A mode processing, a B mode processing and an IT (InterText) support implemented by the CPU core unit 114, the high-speed memory 111 and the mass storage memory 109. The change of picture sizes and the flicker elimination are implemented by the DSP unit 113 and the product sum operation (Mac) unit 117. The character fonts are read out from the ROM 125.

FIG. 6a shows a functional list for the full screen picture display, while FIGS. 6b and 6c show those of the cases of the multi-picture displays for two or more pictures.

The changing of operations among the modes defined by FIGS. 6a to 6c is implemented based on the instruction from the control unit 119.

For the teletext decoder of this embodiment, it is ranked in three items, i.e., the decoding rate, the picture quality and the handling ability.

First, the decoding rate is controlled by capacities of the CPU core unit 114 and the high-speed memory (e.g., cash memory) 111 used in the CPU core unit 114. The higher the priority of the CPU core unit 114 is, or the more the high-speed memory 111 is used, the faster the decoding rate or the response from the user request will be.

This embodiment shows the case that the more the pictures to be displayed are, the smaller the priority of the CPU core unit 114 and the capacity of the high-speed memory 111 will be.

Since the teletext receiving does not require a real time nature as required for the video signal, the teletext receiving does not result to a severe failure in the displayed picture even though the response is reduced.

Now the picture quality is ranked based on associating modes, character fonts, picture size changing characteristics and scanning line configurations.

There are two kinds of mode A and B in the teletext employed in this country. The latter one has a lot of colors and a high resolution, thus it is able to reproduce a high quality picture.

This embodiment shows an accommodation for the A mode only for multipicture display comprising small size pictures. Although the character font is broadly classified into an outline font and a bit-map font, the former outline font can display higher quality characters. However, it has to operationally figure out the waveform between the points of interest of the characters, so as to need massive amounts of signal processing resources.

On the other hand, the latter bit-map font can display the character font data directly without the waveform processing. When the characters are small in size, there is no problem. However, with increasing the size of characters a discontinuity in the character slanting line will become prominent so as to cause the characters to have a poor-quality. Accordingly, the outline font presents no problem in cope with the case of the full screen display wherein high quality pictures remarkably present.

Further, the picture of the normal teletext receiver is constructed by the filed units, which causes the line flicker shown remarkably on the part where the picture is changed in the vertical direction, when seen in the interlace screen. The best way to reduce such a flicker interference is to make it to non-interlace by interpolating the scanning line which has lacked between the fields, or to perform the LPF processing between the fields.

However, the processing between the fields consumes the RAM mainly such as the field delay. The other way to reduce the flicker interference is to eliminate one side field and display the same field twice. Generally, the latter way is simple. However, in this way the line flicker will also be unremarkable if the screen becomes small, so that this flicker eliminate processing is not always needed.

So, as shown in FIG. 6, for a large size picture such as the full screen picture display the flicker elimination as described above is implemented. For small size picture display the flicker eliminating operation is suspended. Then the control unit 119 indicates that the surplus operation processing resources resulted from suspending the flicker eliminating operation serves for another signal processing.

In the screen size conversion as same as described in FIG. 4, since some picture quality degradations are allowed when the screen is small the number of taps of the interpolation filter can be reduced.

Finally, as to support functions there are shown example of the presence or absence of supports for various data decode or a bidirectional property. In this example, the support function is ranked in orders that the more the pictures are and the smaller the picture size is, the more the bidirectional property represented by such as the picture data display or IT (Inter Text) is reduced.

When the picture size becomes smaller the details of the picture inherently become difficult to be grasped, and furthermore the importance of the picture decreases for viewers. Thus in this case it presents no problem to provide information consisting of only characters.

Now some examples of controls of the Internet terminal apparatus will be described in reference to FIGS. 5a to 5c.

In reference to FIGS. 5a to 5c, processing of the WWW, the Internet mail and the Internet news are implemented by the CPU core unit 114, the high-speed memory 111 and the mass storage memory 109. The picture size change and the flicker elimination are implemented by the DSP unit 113, the product sum operation (Mac) unit 117, the high-speed memory 111 and the mass storage memory 109. The color processing is implemented by the CPU core unit 114 and the high-speed memory 111. While the color data is processed with aid of the ROM 125. The font is also read out from the ROM 125.

The Internet terminal apparatus is similar to the teletext receiver in not only their configurations, but also in their operations for processing of non-real time information.

So, as same as the teletext decoder receiving, it can be applied the control methods controlled by the control unit 119. In this case it is also ranked in accordance with the decoding rate, the picture quality and the handling ability. First, as to the decoding rate the control method depending on the priority of the CPU core unit 114 and the capacity of the high-speed memory 111 can be implemented as same as the teletext receiver. The control unit 119 controls to reduce the operation processing resources per one screen by reducing the priority of the CPU core unit 114 and the capacity of the high-speed memory 111 when the number of pictures becomes greater.

The Internet terminal apparatus can be controlled by the signaling rate control with the external network such as the telephone line. The lower the receiving rate is, the less the input data to be processed per the unit time will be. The surplus of the computing resources is thus able to serve for another processing.

The 28 Kbps system has become mainstream for the signaling rate used in the telephone line. However, since it is basically processed in non-real time operations, the signaling rate can be lowered to, e.g., 9600 bps.

FIG. 5 shows the case that the more the pictures are the lower the signaling rate is reduced.

In the WWW which is one of the Internet applications, a historic recording performance is also important. For accessing again a URL which have been accessed before, the historic recording performance makes it possible to fast decode without needs of receiving again the data via the network by temporarily recording a browser file data of the URL. Especially, it is extremely effective for receiving massive amounts of data from the network having the late signaling rate such as the telephone line.

In this case, the mass storage memory 109 is used for the historic recording. In this embodiment, the control unit 119 so controls that the more the number of pictures increases the smaller the memory capacity to be utilized is reduced.

Then the surplus memory area is used for other computing resources.

Next, the picture quality is ranked in accordance with the character fonts, the picture size changing characteristics, the scanning line configurations and an Number of colors. In similar to the teletext receiver, the control unit 119 controls to employ low resolution character fonts such as a bit-map font and a broad characteristic interpolation filter such as the product sum operation (Mac) unit 117, when the number of the pictures increases. Thus the control unit 119 changes the computing resources necessary for each picture. As to an Number of colors, the full screen picture display wherein high quality pictures present is displayed in full color, while the number of colors are decreased with increasing the number of picture screens.

Finally, the handling ability is described for the WWW. The WWW covers four kinds of information; i.e., characters, sounds, still-pictures and moving pictures (video data). Among them the character information is more important than others for it is used as the guide of next server. On since the other hand, the sound information is used as the decorative purposes, it is not always needed for the multi-picture display. Although the picture-relating information is dispensable for showing the picture beautiful, the contents becomes hard to be grasped for the multi-picture display comprising small size pictures as same as the NTSC video decoder.

If the video information is wholly lost, only the remaining character information can continually operate as a browser. FIG. 5 shows examples of deleting the sound and video function in this order when the pictures become great in number.

The sound and the video decodings consume massive amounts of computing resources such as the CPU core unit 114, the high-speed memory 111, the mass storage memory 109, the DSP unit 113 and the product sum operation (Mac) unit 117. Then, the control unit 119 can be used for controls to disable these functions so as to assign the computing resources to other processing.

FIG. 5 shows the function limit example of the WWW. However, it is not limited to the way shown in FIG. 5, but it can be applied to other applications such as the mail.

Figure 7:
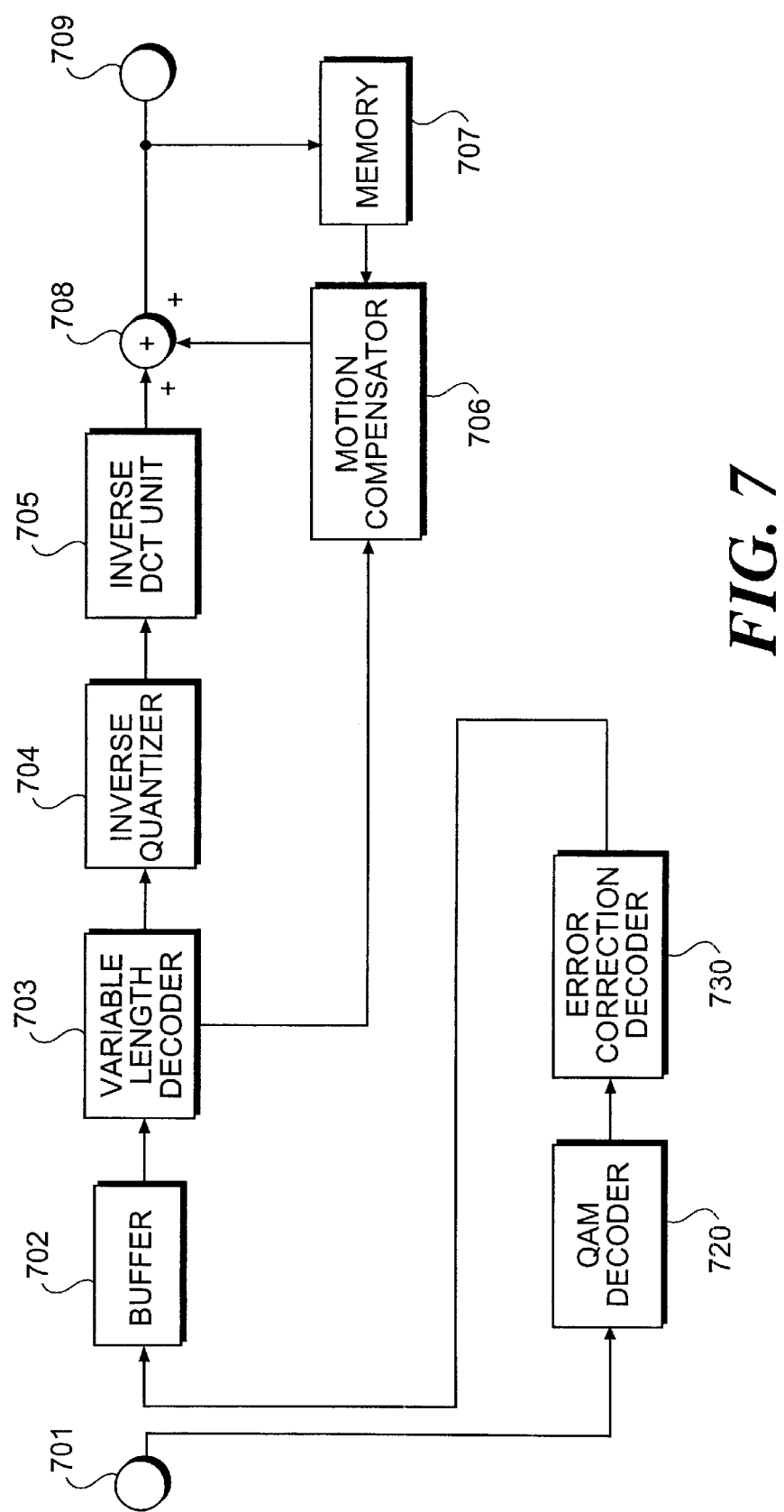
FIG. 7 is a block diagram showing the detail of the MPEG decoder in FIG. 1.
Figure 8:
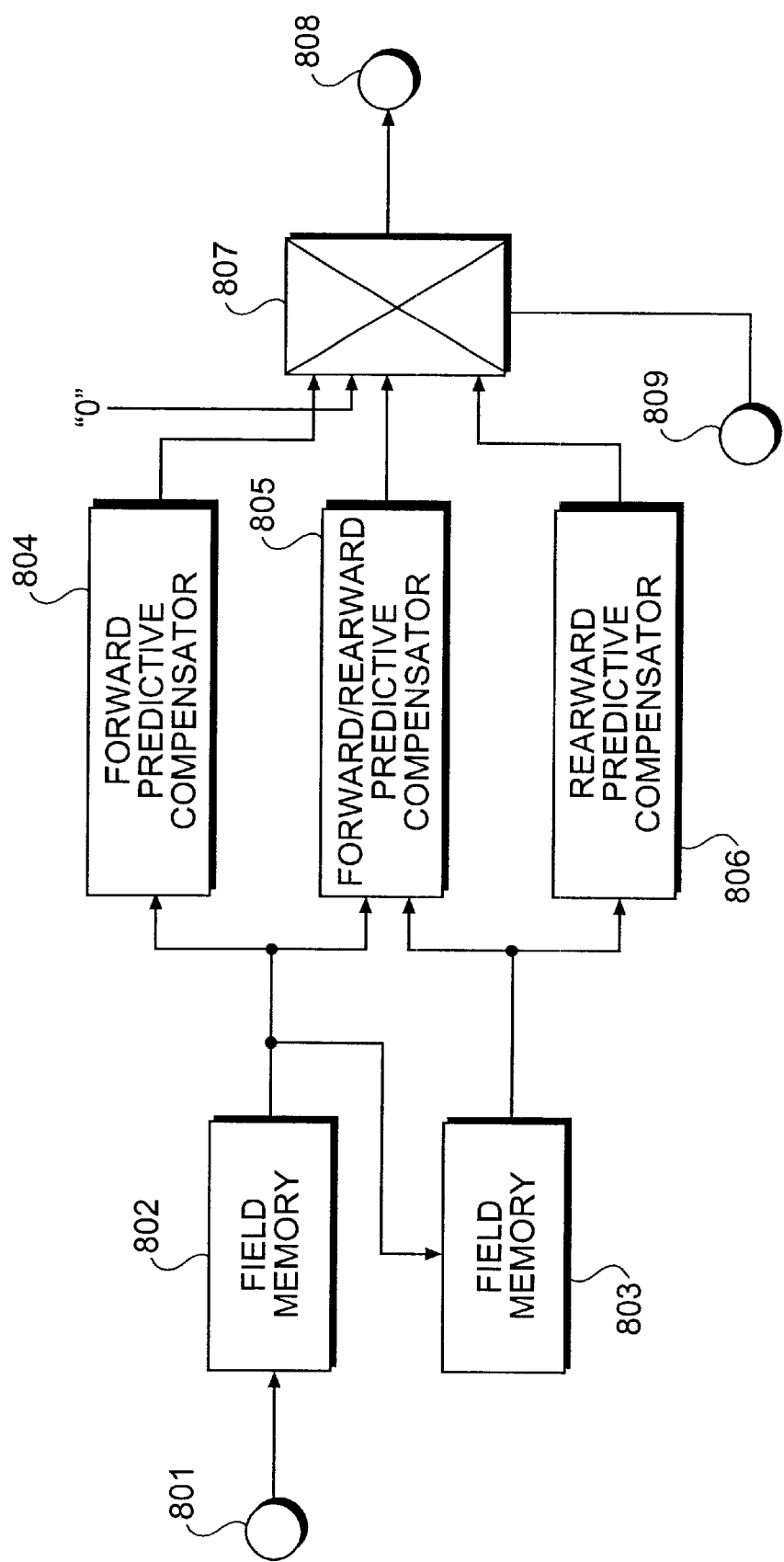
FIG. 8 is a block diagram showing the detail of the motion compensator in FIG. 7.

FIG. 7 shows an embodiment of the MPEG decoder, while FIG. 8 shows an embodiment of the motion compensator. FIGS. 9a to 9c show embodiment of the control application example for using the MPEG decoder. Hereinafter the application example in the MPEG decoder will be described.

To an input terminal 701 the MPEG data which have took the input processing in the input processor 107 are input. The input signal is decoded in a QAM decoder 720. Then it is corrected the error in an error correction decoder 730 to be the MPEG bit stream. After that it is temporarily stored in a buffer 702.

The buffer stores the data transferred in the variable length as serial to parallel, and it also operates as the temporary data waiting for the later processing which has no fixed processing time.

An outputs from a variable length decoder 703 are entropy decoded in an inverse quantizer 704, and implemented the inverse DCT in an inverse DCT unit 705 so as to be converted into the amplitude data.

The converted data are implemented the inter-frame or inter-field interpolation based on motion vector data obtained from the variable length decoder 703 by using an adder 708, a memory 707 and a motion compensator 706.

In FIG. 7, the QAM decoder 720 corresponds to the DSP unit 113 and the product sum operation (Mac) unit 117, and the error correction decoder 730 corresponds to the DSP unit 113. The buffer 702 corresponds to the high-speed memory 111, the memory 707 corresponds to the mass storage memory 109. The variable length decoder 703, the inverse quantizer 704, the adder 708 and the motion compensator 706 correspond to the DSP unit 113 and the CPU core unit 114.

FIG. 8 shows the construction of the motion compensator 706 and the memory 707. For the MPEG2 the motion compensation is implemented based on three steps as described hereinafter by the instruction from the control unit 119.

1. Motion compensation is absent (I-picture);
2. Motion compensation is present in only past picture (P-picture); and
3. Motion compensation is present in both of past and future pictures (Bpicture).

Accordingly, the past, present and future signals are generated in field memories 802 and 803 as shown in FIG. 8, and based on the motion vector data input through a control input terminal 809 a specified signal is selected among the past, future or both interpolations.

An input terminal 801 receives the outputs from the adder 708. The field memories 802 and 803 correspond to the memory 707. A selector 807 receives outputs of a forward predictive compensator 804, a forward/rearward predictive compensator 805 and a rearward predictive compensator 806 and a specific value 0. The output of the selector 807 is supplied to the adder 708.

The selector 807 selects the particular value 0 when motion compensation is absent (I-picture). While it selects the output of the rearward predictive compensator 806 when motion compensation is present in only the past video (P-picture). Further it selects one of the outputs of the compensators 804, 805 and 806 when motion compensation is present in both of past and future pictures (B-picture). These operations are implemented by instructions from the control unit 119.

FIGS. 9a to 9c show the adaptive control examples of the MPEG decoder. The adaptive controls of the MPEG decoder are implemented by instructions from the control unit 119.

FIG. 9a shows the adaptive control for the full screen picture display wherein the picture quality is not allowed to degrade screen. While FIGS. 9b and 9c show the adaptive controls for relatively small number multi-picture display and for relatively large number multi-picture display wherein the picture quality is allowed to degrade in some degree.

These cases show a control which results to influence over the moving direction and the spatial frequency characteristics of the picture.

First, the operation of the motion compensator 706 as shown in FIG. 8 is controlled by instructions from the control unit 119. The MPEG-2 bit stream has three motion compensation schemes definition for each frame or field.

For multi-picture display, the decoding of the B-picture or the P-picture among these three schemes is suspended, but only the I-picture is decoded. While for the dropout frames, the past frame is displayed repeatedly for the lacked frame.

In this case, the frame is intermitted and the motions of the pictures are deteriorated as a matter of course. However, the video information contents are displayable even by only the I-picture. Since for multi-picture display the viewer's concentration lowers, an intermittent display of frames will not cause so much problems.

In current TV receivers, the same drawback has been generated even in so-called a channel search function, which displays many received channels at one time. The present embodiment shows the case that all motion compensations are stopped for more than two channels as shown in FIG. 9b. However, it is not limited to this example. For instance, it may stop only the B-picture decoding at the two channels time, and it may stop the B-picture and P-picture decodings at the three channels time.

Further, FIG. 9 shows the case for controlling DCT coefficients for the spatial frequency characteristic control. In the MPEG decoder the DCT is implemented in every macro-block of 8 by 8 pixels.

FIG. 9 shows the case that upper DCT coefficients are eliminated, and the inverse DCT is implemented by lower DCT coefficients. Since if the upper DCT coefficients are eliminated the horizontal and the vertical high frequency components are thinned out, the picture will become unclear when the picture is expanded to the original size.

When the DCT is adapted for the frame difference from the past frame, the picture motion is deteriorated as a matter of course. However, the original information of the picture is not without of being completely converted to another information, it is only deteriorated qualitatively. Besides, such deterioration is not serious for the multi-picture display comprising small size pictures. Especially, the sharpness is impaired in the still picture. However its influence is reduced if the screen becomes smaller.

The MPEG-2 has the definition of profiles such as an SNR or a Spatial. These profiles are provided for encoding high frequency components in isolation and then transmitting the encoded results. However, there is also another scheme of disabling these profiles by the instruction from the control unit 119 for the multi-picture display. In this case, only the sharpness of the picture is lost, but the lack of the sharpness is admitted for small size picture displays.

In the embodiment as described above, the example of using the surplus computing resources in the picture size compression/expansion for e.g., an image data compression/expansion is described. However, the surplus computing resources may be used for the teletext receiver or the MPED decoder based on the control of the control unit 119.

It is needless to say that the present invention is not limited the above embodiment of the TV receiver as shown in FIG. 1 for the signal processing.

Figure 12:
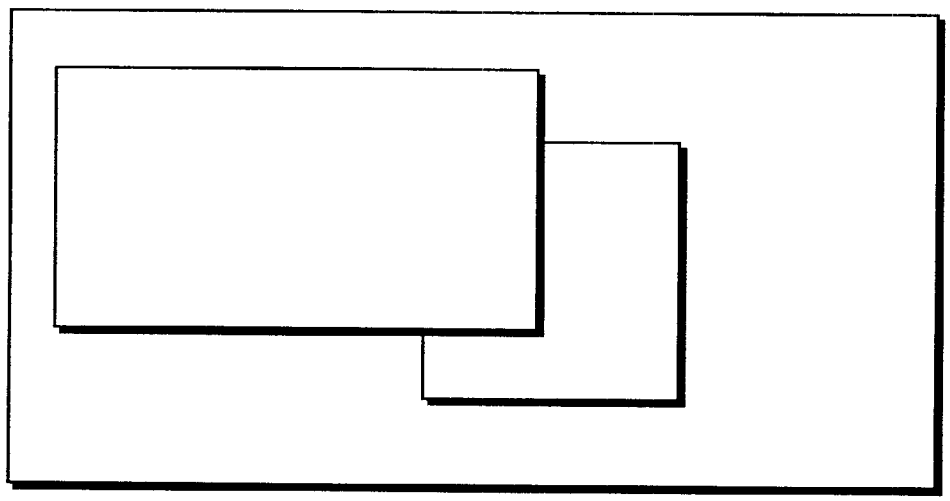
FIG. 12 is a diagram showing another example of a picture display on a TV receiver.

Further, for the multi-picture display, the picture size is not always small as the overlapping display style as shown in FIG. 12. In this case, the background picture is almost hidden. Thus the first front picture is stressed. Then if the first front picture is of the NTSC broadcast reception mode it is desirable to be decoded using the three-dimensional Y/C separation technique in accordance with the instruction from the control unit 119. While if the first front picture is of the teletext reception mode it is desirable to be decoded using the functions as shown in FIG. 6b.

Since the latter screen is not viewed actually, a fixed picture can be displayed as the still picture. This present display style depends on the user instruction basically, so that such information are easy to obtain through the control input terminal 122 shown in FIG. 1.

The control method is not limited to the fixed method, but it may be changed automatically according to the priority determined by the control unit 119 based on the picture size or display style.

Further, in the embodiment as described above, it is described to provide all pictures the same priority at the multi-picture display time. However, it is not necessary to be the same level. For instance, for the overlap style shown in FIG. 12 the upper picture may has higher priority and lower picture may has lower one.

As described above, the present invention can provide an extremely preferable TV receiver with selectable signal processing systems.

That is, according to the present invention, the number, the type and the state of the displayed picture are monitored using the usage situation of the multi-picture display. The signal processing performance and function are deteriorated in the order of the signal having the lower priority according to the monitored result, so as to reduce the capacity required for the signal processing per one channel. Thus the surplus signal processing resources is able to use for other signal processings.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A TV receiver with selectable signal processing systems, comprising:
   programmable digital signal processing device configured to change internal signal processing systems according to a signal processing control signal;
   input signal monitor configured to monitor at least any one of the number and the type of the input TV signals; and
   signal processing control unit configured to indicate the signal processing control signal to the signal processing device according to the monitored result;
   wherein the signal processing control unit is provided with priority control system configured to allot the priority for each signal processing in the signal processing device, and the signal processing device also changes the signal processing system in order of lower priority based on the instruction from the priority control system.

2. A TV receiver with selectable signal processing systems, comprising:
   programmable digital signal processing device configured to change the internal signal processing systems according to a signal processing control signal;
   input signal monitor configured to monitor at least any one of the number, the type and the state of the displayed video signal; and
   signal processing control unit configured to indicate the signal processing control signal to the signal processing device according to the monitored result;
   wherein the signal processing control unit is provided with priority control system configured to allot the priority for each signal processing in the signal processing device, and the signal processing device also changes the signal processing system in order of lower priority based on the instruction from the priority control system.

3. A TV receiver with selectable signal processing systems, comprising:
   programmable digital signal processing device configured to change the internal signal processing systems according to a signal processing control signal;
   input signal monitor and signal display monitor configured to monitor at least any one of the number, the type and the state of the displayed video signal; and
   signal processing control unit configured to indicate the signal processing control signal to the signal processing device according to both the monitor results;
   wherein the signal processing control unit is provided with priority control system configured to allot the priority for each signal processing in the signal processing device, and the signal processing device also changes the signal processing system in order of lower priority based on the instruction from the priority control system.

4. A TV receiver with selectable signal processing systems as claimed in any one of claims 1 and 2; wherein the more the input signals are input, the lower the signal processing ability for processing one signal in the signal processing device is lowered by the signal processing control unit, so that the signal processing control signal is output, which makes the signal processing device have surplus resources and assigns the surplus resources to other signal processing.

5. A TV receiver with selectable signal processing systems as claimed in any one of claims 2 and 3, wherein the lower the priority of the displayed signal decreased, the lower the signal processing ability for processing one signal in the signal processing device is decreased by the signal processing control unit, so that the signal processing control signal which makes the signal processing resources of the signal processing device have surplus resources and assigns the surplus resources to other signal processing is output to the signal processing device.

6. A TV receiver with selectable signal processing systems as claimed in any one of claims 2 and 3, wherein the smaller the size of the picture display screen becomes, the lower the signal processing ability for processing one signal in the signal processing device is decreased by the signal processing control unit, so that the signal processing control signal which makes the signal processing resources of the signal processing device have surplus resources and assigns the surplus resources to other signal processing is output to the signal processing device.

7. A TV receiver with selectable signal processing systems as claimed in any one of claims 1, 2 and 3, wherein the signal processing control unit includes a decoder for decoding an NTSC video signal, and the signal processing control unit also changes at least one of a Y/C separation ability and an enhancer ability for receiving an instruction for changing processing ability from the signal processing control unit.

8. A TV receiver with selectable signal processing systems as claimed in any one of claims 1, 2 and 3, wherein the signal processing device includes picture size compression/expansion means provided with a interpolation filter, and the signal processing device also changes the number of taps of the interpolation filter for receiving an instruction for changing the processing ability from the signal processing control unit.

9. A TV receiver with selectable signal processing systems as claimed in anyone of claims 1, 2 and 3, wherein the signal processing device includes character processing device for producing texts to be displayed, and the signal processing device also changes the processing systems in the character processing device for receiving the instruction for changing the processing ability from the signal processing control unit.

10. A TV receiver with selectable signal processing systems as claimed in any one of claims 1, 2 and 3, wherein the signal processing device includes communication processing device for communicating with a communication network, and the signal processing device also changes the signaling rate of the communication processing device for receiving an instruction for changing the processing ability from the signal processing control unit.

11. A TV receiver with selectable signal processing systems as claimed in any one of claims 1, 2 and 3, wherein the signal processing device includes an MPEG decoder, and the signal processing device also changes the decode system not to decode at least one of a B-frame and a P-frame for receiving an instruction for changing the processing ability from the signal processing control unit.

12. A TV receiver with selectable signal processing systems as claimed in any one of claims 1, 2 and 3, wherein the signal processing device includes an MPEG decoder, and the signal processing device also changes the decode system to decode by dropping at least one digital signal out of the input signal and the output signal of an inverse DCT transform for receiving an instruction for changing the processing ability from the signal processing control unit.

13. A TV receiver with selectable signal processing systems as claimed in any one of claims 1, 2 and 3, wherein the signal processing device is provided with a storage for temporary storing a picture to be displayed in including characters, and the signal processing device also changes at least one of the number of color or a resolution of the picture to be shown by controlling the input or output of the storage means.

14. A TV receiver with selectable signal processing systems, comprising:

a programmable digital signal processor capable of changing internal signal processing systems according to a signal processing control signal;

an input signal monitor for monitoring at least any one of the number and the type of the input TV signals; and a signal processing controller for indicating the signal processing control signal to the signal processor according to the monitored result;

wherein the signal processing controller is provided with priority controller for allotting the priority for each signal processing in the signal processor, and the signal processor also changes the signal processing system in order of lower priority based on the instruction from the priority controller.

15. A TV receiver with selectable signal processing systems, comprising:

a programmable digital signal processor capable of changing the internal signal processing systems according to a signal processing control signal;

an input signal monitor for monitoring at least any one of the number, the type and the state of the displayed video signal; and a signal processing controller for indicating the signal processing control signal to the signal processor according to the monitored result;

wherein the signal processing controller is provided with priority controller for allotting the priority for each signal processing in the signal processor, and the signal processor also changes the signal processing system in order of lower priority based on the instruction from the priority controller.

16. A TV receiver with selectable signal processing systems, comprising:

a programmable digital signal processor capable of changing the internal signal processing systems according to a signal processing control signal;

an input signal monitor and a signal display monitor for monitoring at least any one of the number, the type and the state of the displayed video signal; and a signal processing controller for indicating the signal processing control signal to the signal processor according to both the monitor results;

wherein the signal processing controller is provided with priority controller for allotting the priority for each signal processing in the signal processor, and the signal processor also changes the signal processing system in order of lower priority based on the instruction from the priority controller.

17. A TV receiver with selectable signal processing systems as claimed in any one of claims 14 and 15; wherein the more the input signals are input, the lower the signal processing ability for processing one signal in the signal processor is lowered by the signal processing controller, so that the signal processing control signal is output, which makes the signal processor have surplus resources and assigns the surplus resources to other signal processing.

18. A TV receiver with selectable signal processing systems as claimed in any one of claims 15 and 16, wherein the lower the priority of the displayed signal decreased, the lower the signal processing ability for processing one signal in the signal processor is decreased by the signal processing controller, so that the signal processing control signal which makes the signal processing resources of the signal processor have surplus resources and assigns the surplus resources to other signal processing is output to the signal processor.

19. A TV receiver with selectable signal processing systems as claimed in any one of claims 15 and 16, wherein the smaller the size of the picture display screen becomes, the lower the signal processing ability for processing one signal in the signal processor is decreased by the signal processing controller, so that the signal processing control signal which makes the signal processing resources of the signal processor have surplus resources and assigns the surplus resources to other signal processing is output to the signal processor.

20. A TV receiver with selectable signal processing systems as claimed in any one of claims 14, 15 and 16, wherein the signal processing controller includes a decoder for decoding an NTSC video signal, and the signal processing controller also changes at least one of a Y/C separation ability and an enhancer ability for receiving an instruction for changing processing ability from the signal processing controller.

21. A TV receiver with selectable signal processing systems as claimed in any one of claims 14, 15 and 16, wherein the signal processor includes picture size compression/expansion device provided with a interpolation filter, and the signal processor also changes the number of taps of the interpolation filter for receiving an instruction for changing the processing ability from the signal processing controller.

22. A TV receiver with selectable signal processing systems as claimed in any one of claims 14, 15 and 16, wherein the signal processor includes character processor for producing texts to be displayed, and the signal processor also changes the processing systems in the character processor for receiving the instruction for changing the processing ability from the signal processing controller.

23. A TV receiver with selectable signal processing systems as claimed in any one of claims 14, 15 and 16, wherein the signal processing means includes communication processing means for communicating with acommunication network, and the signal processor also changes the signaling rate of the communication processor for receiving an instruction for changing the processing ability from the signal processing controller.

24. A TV receiver with selectable signal processing systems as claimed in any one of claims 14, 15 and 16, wherein the signal processor includes an MPEG decoder, and the signal processor also changes the decode system not to decode at least one of a B-frame and a P-frame for receiving an instruction for changing the processing ability from the signal processing controller.

25. A TV receiver with selectable signal processing systems as claimed in any one of claims 14, 15 and 16, wherein the signal processor includes an MPEG decoder, and the signal processor also changes the decode system to decode by dropping at least one digital signal out of the input signal and the output signal of an inverse DCT transform for receiving an instruction for changing the processing ability from the signal processing controller.

26. A TV receiver with selectable signal processing systems as claimed in any one of claims 14, 15 and 16, wherein the signal processor is provided with a storage for temporary storing a picture to be displayed in including characters, and the signal processor also changes at least one of the number of color or a resolution of the picture to be shown by controlling the input or output of the storage.

* * * * *